(12) United States Patent
Crum et al.

(10) Patent No.: US 10,404,117 B2
(45) Date of Patent: Sep. 3, 2019

(54) METHODS AND SYSTEMS TO MOUNT A ROTOR TO A SHAFT

(71) Applicant: TRANE INTERNATIONAL INC., Davidson, NC (US)

(72) Inventors: Daniel R. Crum, Huntersville, NC (US); Robert S. Bakkestuen, Onalaska, WI (US); Greg Chilcote, Onalaska, WI (US); Aaron Salesman, Viroqua, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 16/025,076

(22) Filed: Jul. 2, 2018

(65) Prior Publication Data

US 2018/0331592 A1 Nov. 15, 2018

Related U.S. Application Data

(63) Continuation of application No. 14/668,146, filed on Mar. 25, 2015, now Pat. No. 10,014,739.

(Continued)

(51) Int. Cl.
*H02K 1/28* (2006.01)
*H02K 15/02* (2006.01)
*H02K 7/00* (2006.01)

(52) U.S. Cl.
CPC .............. *H02K 1/28* (2013.01); *H02K 7/003* (2013.01); *H02K 15/028* (2013.01); *H02K 2213/03* (2013.01)

(58) Field of Classification Search
CPC ........ H02K 1/28; H02K 7/003; H02K 15/028; H02K 2213/03
(Continued)

(56) References Cited

U.S. PATENT DOCUMENTS

| 614,944 A | 11/1898 | Gaylor |
| 3,360,276 A | 12/1967 | Peffer |

(Continued)

FOREIGN PATENT DOCUMENTS

| CN | 101517253 A | 8/2009 |
| CN | 103032324 A | 4/2013 |

(Continued)

OTHER PUBLICATIONS

International Search Report and Written Opinion for International Application No. PCT/US2015/022460, dated Jun. 29, 2015, 20 pgs.

(Continued)

*Primary Examiner* — Quyen P Leung
*Assistant Examiner* — Rashad H Johnson
(74) *Attorney, Agent, or Firm* — Hamre, Schumann, Mueller & Larson, P.C.

(57) ABSTRACT

Methods, systems and apparatuses for mounting a motor rotor to a shaft of a compressor are disclosed. The shaft can include a rib region that is configured to form a press fit or a transition fit with the rotor bore. An end of the shaft can also include a plurality of crenulations that can be expanded outwardly in a radial direction relative to a centerline of the shaft. After the rotor is mounted onto the shaft, the crenulations can be expanded to eliminate the clearance between the shaft and the rotor to form a press fit with the rotor bore.

16 Claims, 7 Drawing Sheets

Related U.S. Application Data

(60) Provisional application No. 61/970,015, filed on Mar. 25, 2014.

(58) Field of Classification Search
USPC ....... 310/156.14, 156.15, 216.116–123, 263, 310/75 D; 403/282
See application file for complete search history.

(56) References Cited

U.S. PATENT DOCUMENTS

| | | | |
|---|---|---|---|
| 3,561,798 A | 2/1971 | Redfern | |
| 3,664,258 A | 5/1972 | Vecchi | |
| 3,776,651 A | 12/1973 | Peter et al. | |
| 4,178,777 A | 12/1979 | Ying et al. | |
| 4,488,738 A * | 12/1984 | Valdes | F16L 15/001 285/40 |
| 4,668,116 A | 5/1987 | Ito | |
| 4,745,998 A | 5/1988 | Stilin | |
| 4,886,392 A | 12/1989 | Iio | |
| 5,158,390 A | 10/1992 | Ito et al. | |
| 5,308,183 A | 5/1994 | Stegeman et al. | |
| 5,380,118 A | 1/1995 | Stahlecker et al. | |
| 5,543,672 A * | 8/1996 | Nishitani | G01P 1/04 188/164 |
| 5,716,156 A | 2/1998 | Bayer et al. | |
| 5,961,247 A | 10/1999 | Gold et al. | |
| 6,039,497 A | 3/2000 | Gullberg | |
| 6,074,119 A | 6/2000 | Schlanger | |
| 6,364,605 B1 * | 4/2002 | Lutes | F04D 5/002 277/370 |
| 6,744,159 B2 | 6/2004 | Droll et al. | |
| 7,484,813 B2 | 2/2009 | Dantele | |
| 8,925,402 B2 * | 1/2015 | Metral | F02N 15/023 123/185.6 |
| 9,334,763 B1 | 5/2016 | Hopkins et al. | |
| 2002/0164252 A1 | 11/2002 | Haugen et al. | |
| 2005/0079049 A1 * | 4/2005 | Ishihara | F02B 37/183 415/182.1 |
| 2010/0109490 A1 * | 5/2010 | Bahr | H02K 11/21 310/68 B |
| 2010/0232950 A1 | 9/2010 | Svendsen | |
| 2012/0151733 A1 | 6/2012 | Fabre et al. | |
| 2014/0140868 A1 | 5/2014 | Ignatiev et al. | |

FOREIGN PATENT DOCUMENTS

| | | |
|---|---|---|
| CN | 203130499 U | 8/2013 |
| GB | 2184050 A | 6/1987 |
| JP | 57-090347 A | 6/1982 |
| JP | 61-149615 A | 7/1986 |
| JP | 2007295714 A | 11/2007 |
| JP | 2014-45569 A | 3/2014 |

OTHER PUBLICATIONS

Office Action, Chinese Patent Application No. 201580027286.5, dated Jun. 25, 2018, with partial English translation (10 pages).

* cited by examiner

METHODS AND SYSTEMS TO MOUNT A ROTOR TO A SHAFT

FIELD

The disclosure herein relates to a compressor in a heating, ventilation and air conditioning (HVAC) system. More specifically, methods, systems and apparatuses are disclosed to mount a rotor of a motor to a shaft of the compressor so that the motor can drive the compressor.

BACKGROUND

A HVAC system often uses a compressor to compress the refrigerant. In some cases, the compressor can be driven by an electric motor. The electric motor typically includes a stationary stator and a rotatable rotor. The rotor can be connected to a shaft of the compressor, so that a torque generated by the stator and the rotor can be transmitted from the rotor to the shaft, which can then drive the compressor.

SUMMARY

Methods, systems and apparatuses are described to help mount a rotor of a motor to a shaft of, for example, a compressor of a HVAC system. The motor may be used to drive the compressor, such as for example a screw compressor. Generally, the shaft may include a first portion that can form a press fit or a transition fit inside a bore of the rotor, and an expandable second portion. The second portion may be an end portion of the shaft. The second portion, when not expanded, can form a clearance fit with the bore of the rotor. In installation, the first portion can generally hold the shaft inside the rotor, and the second portion can be expanded to eliminate the clearance between the rotor and the second portion and consequently form a press fit with the shaft and the rotor. The embodiments as disclosed herein can help reduce/eliminate the use of heat to mount a rotor to a shaft.

In some embodiments, the shaft can be generally received by a center rotor bore of the rotor. In some embodiments, a first portion of the shaft may include a rib along a circumference of the shaft, which may be configured to form a press fit or a transition fit with the rotor bore of the rotor.

In some embodiments, an end of the shaft may include a plurality of crenulations and a cavity, which can be used to, for example, accommodate a connecting device (e.g. a screw). In some embodiments, the cavity can be a threaded hole that can receive a screw. The plurality of crenulations can be expanded in a radial direction relative to a centerline by a plug positioned in a pocket defined by the crenulations. In some embodiments, the plurality of crenulations may include a tapered inner surface.

In some embodiments, the shaft may include a cavity extending into the end of the shaft, which is configured to engage the connecting device. The tightening of the connecting device into the cavity can help push the plug into the pocket. The plug can engage the tapered inner surface of the plurality of crenulations and expand the plurality of crenulations in the radial direction relative to the centerline of the shaft. The radial expansion of the plurality of crenulations can eliminate the clearance between the rotor and the shaft and can help form a press fit between the shaft and the rotor bore.

In some embodiments, the shaft may include a guiding portion relatively close to the rib. In some embodiments, the guiding portion may be configured to form a clearance fit with the rotor bore of the rotor. In some embodiments, the shaft may include a grind relief region, which may be configured to form a clearance fit with the rotor bore of the rotor. In some embodiments, a diameter of the grind relief region may be smaller than a diameter of the guiding portion.

In some embodiments, the plug may be configured to include a guiding portion that is configured to form a clearance fit with a portion of the rotor bore when a connecting device of the plug engages the plurality of crenulations.

Other features and aspects of the embodiments will become apparent by consideration of the following detailed description and accompanying drawings.

BRIEF DESCRIPTION OF THE DRAWINGS

Reference is now made to the drawings in which like reference numbers represent corresponding parts throughout.

FIG. 1A is a cross-section view of the motor. FIG. 1B is a side section view of a portion of a shaft of compressor, which engages a rotor of the motor.

FIG. 4A illustrates a cross section of the plug. FIG. 4B illustrates an area B in FIG. 4A.

DETAILED DESCRIPTION

Figure 1A:
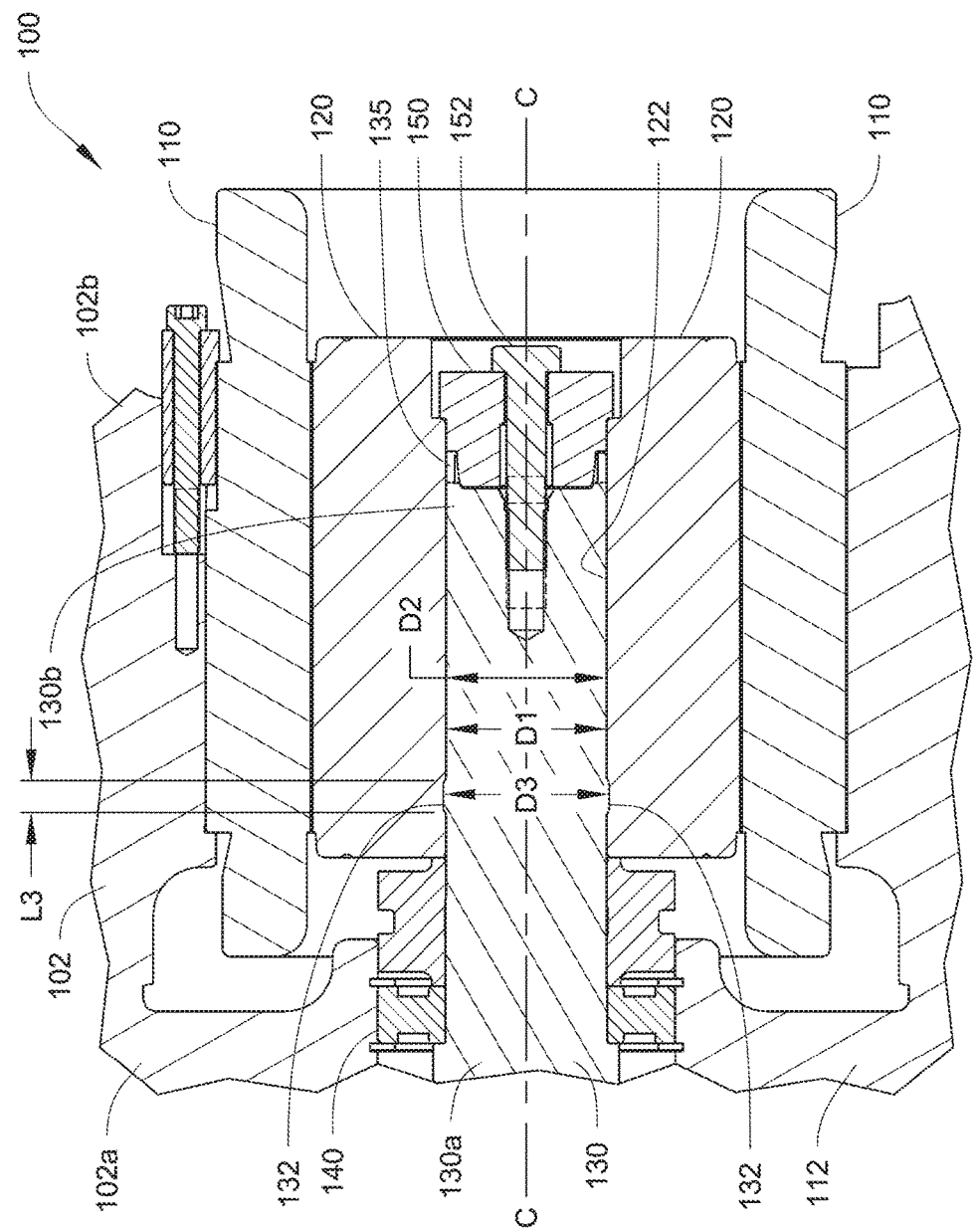
FIGS. 1A and 1B illustrate a motor and a shaft, according to one embodiment.

A compressor of a HVAC system can be driven by an electric motor. Generally, an electric motor may include a stator and a rotor. In operation, magnetic fields generated by the stator and the rotor can interact with each other to generate a torque. The torque generated by the electric motor can be transmitted from the rotor to the compressor through a rotor that is retained to or connected to the shaft.

Various methods and systems have been developed to mount the rotor of the motor to the shaft of the compressor. For example, in some cases, the shaft and the rotor can be coupled by a key. This method and system can cause issues, such as unbalanced rotor/shaft assembly. In some cases, the shaft can be retained to the rotor with an axially clamping method and/or with a press fit between the shaft and the rotor. The axially clamping method can sometimes result in distortion of the parts, e.g. bending of the rotor, causing balance issues. In some cases, heat can be used to expand a center bore of the rotor so as to facilitate mounting the rotor to the shaft in the center bore. However, when a rotor with permanent magnets is used, excessive heat may cause demagnification of the magnets. Improvements can be made to the retention/mounting methods and systems that help mount the rotor to the shaft and help improve balancing the rotor/shaft assembly and/or reduce the need to heat the rotor for mounting.

Embodiments to help mount the rotor of the motor to the shaft are disclosed. The rotor may include a center rotor bore configured to receive a shaft of a compressor. The shaft may include a circumferential rib that can form a transition or press fit with the rotor bore of the rotor. The rib can be relatively short in a longitudinal direction of the shaft so that the rotor can be slid onto the shaft relatively easily first when the rotor is mounted to the shaft. An end of the shaft may include a plurality of radially expandable portions, such as for example crenulations. After the rotor is initially mounted to the shaft, the plurality of the crenulations generally form a clearance fit with the rotor. The plurality of crenulations can then be expanded radially to eliminate the clearance between the shaft and the rotor bore to form a press fit with the rotor. The press fit can help transmit the torque from the rotor to the shaft.

References are made to the accompanying drawings that form a part hereof, and in which is shown by way of illustration of the embodiments in which the embodiments may be practiced. It is to be understood that the terms used herein are for the purpose of describing the figures and embodiments and should not be regarded as limiting the scope of the present application.

FIG. 1 illustrates a cross-section of a motor 100 that can be used to drive, for example, a compressor 112 of a HVAC system (only an end portion of the compressor 112 is shown), according to one embodiment. The motor 100 includes a motor housing 102 that houses a stator 110 and a rotor 120 surrounded by the stator 110. Generally, the stator 110 is stationary and the rotor 120 is rotatable inside the motor housing 102. The rotor 120 is mounted to a shaft 130 that may be configured to drive, for example, the compressor 112.

When electricity is applied to the motor 100, the stator 110 and the rotor 120 can work together to generate a torque. The torque can be transmitted to the shaft 130, which then can be used to drive rotation of the shaft 130.

The motor housing 102 has a first end 102a and a second end 102b. The shaft 130 has a first end 130a and a second end 130b. The shaft 130 is generally supported by a bearing 140 positioned between the shaft 130 and the motor housing 102 at the first end 102a, which can help reduce a friction created by the rotation of the shaft 130.

The motor 100 can include one or more features to help mount the rotor 120 to the shaft 130 so that the torque created by the stator 110 and the rotor 120 can be transmitted to the shaft 130.

Generally, the rotor 120 has a rotor bore 122. The rotor bore 122 is generally centered in the rotor 120 along a longitudinal centerline C of the rotor 120. Generally, the centerline C can be a common centerline for the rotor 120, the stator 110 and the shaft 130. The shaft 130 generally has a diameter D1 and the rotor bore 122 has a diameter D2. Generally, the shaft diameter D1 is about the same as or just a little less than the rotor bore diameter D2 so that the rotor 120 can slide onto the shaft 130 relatively easily to form, for example, a close clearance fit. The term "close clearance fit" generally means that the shaft 130 is assembled into a matching rotor bore 122 with a slightly larger diameter to allow for easy insertion and/or removal of the shaft (e.g. at or about 0.0005 inch to at or about 0.002 inch loose).

A portion of the shaft 130 can have a rib 132 along a circumference of the shaft 130. The rib 132 is generally a protruded region along the circumference of the shaft 130 that has a diameter D3 that is slightly larger than the diameter D1 of the shaft 130 and the diameter D2 of the rotor bore 122, so that the rib 132 can form a press fit (e.g. a light press fit) with the bore 122. In some embodiments, the diameter D3 is at or about 0.002 inch larger than the diameter D2 of the rotor bore 122. In some embodiments, the rib 132 and the rotor bore 122 can form a close clearance or transition fit. It will be appreciated that the exact diameters can vary to achieve a press fit, clearance fit or transition fit depending on the manufactured size of the rotor bore 122, so as to be within a tolerable range.

The rib 132 is generally relatively closer to the first end 130a of the shaft 130 than the second end 130b of the shaft 130. When the rotor 120 slides on the shaft 130, the rotor bore 122 and the rib 132 can form a press fit or a transition fit. The term "press fit" generally means that the rib 132 is pressed into the rotor bore 122 that has a slightly smaller diameter D2 than the diameter of the rib 132 (e.g. a diametral fit of 0.0005 inch or about 0.0005 inch to 0.0025 or about 0.0025 inch tight). The term "transition fit" generally means a type of fit that is between the clearance fit and the press fit, where the shaft 130 can be held relatively securely with the rotor 120 by the rib 132, yet not so securely that the shaft 130 cannot be disassembled relatively easily (e.g. from at or about 0.001 inch loose to at or about 0.001 inch tight). Generally, the press fit or the transition fit requires the use of force to push the rotor bore 122 onto the rib 132. A friction force can be created between the two press fitted or transition fitted parts, such as the rotor 120 and the rib 132, which may help transmit the torque from the rotor 120 to the rib 132. In some embodiments, a press force from at or about 0 (slip) to at or about 3500 lbs may be needed to overcome the friction created by the press fit and/or the transition fit. In some embodiments, the press force can range from at or about 500 to at or about 3500 lbs for a press fit, where in some embodiments a press force ranging from at or about 0 (slip) to at or about 2000 lbs for a transition fit. The press fit or the transition fit may also help center and secure the shaft 130 inside the rotor bore 122 so as to help, for example, balance the rotor 120 and the shaft 130.

In some embodiments, a length L3 of the rib 132 in the longitudinal direction that is defined by the centerline C can be relatively short (e.g. at or about 0.1 inch to at or about 0.5 inch). In some embodiments, the length L3 of the rib 132 can be at or about ¼ inch. The relatively short length L3 of the rib 132 can help reduce the press force needed to fit the rotor bore 122 over the rib 132.

By keeping the press force needed to fit the rotor bore 122 over the rib 132 relatively low, it may not be necessary to use heat to expand the rotor bore 122 for mounting. This may help prevent demagnetizing the rotor 120 when a permanent magnetic rotor is used.

Figure 1B:
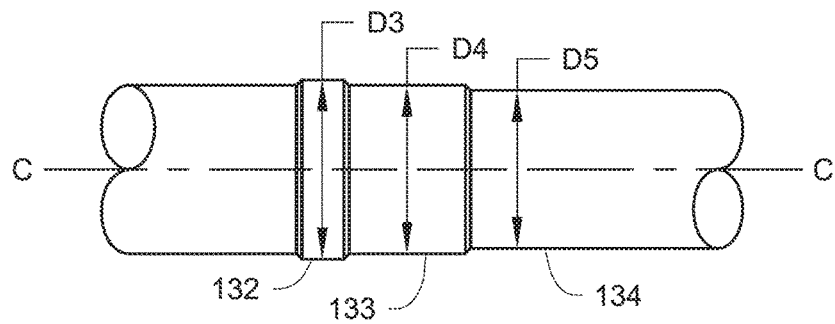

The shaft 130 can also include other features to help mount the rotor bore 122 over the shaft 130. As illustrated in FIG. 1B, the rib 132 has a diameter D3 (which may be slightly larger than or about the same as the diameter D1 of the shaft 130 in FIG. 1A). In some embodiments, the shaft 130 can also have a guide region 133 with a diameter D4, which is generally positioned close to the rib 132 in the longitudinal direction that is defined by the centerline C. In some embodiments, the guide region 133 can be positioned immediately adjacent to the rib 132. In some embodiments, the guide region 133 can be positioned about no more than one inch away from the rib 132. But it will be appreciated that the guide region 133 can be spaced further away from the rib 132. When the rotor bore 122 slides onto the shaft 130 during mounting, the rotor bore 122 generally slides onto the guide region 133 before the rotor bore 122 reaches the rib 132. The diameter D4 is configured to be very close to the diameter D2 of the rotor bore 122, but is generally slightly smaller than the diameter D3 of the rib 132. The guide region 133 can be fitted into the rotor bore 122 relatively easily and can help align the shaft 130 with the rotor bore 122 before pushing the rib 132 into the rotor bore 122 of the rib 132.

A grind relief region 134 can be generally positioned close to the guide region 133 in the longitudinal direction that is defined by the centerline C but further away from the rib 132 compared to the guide region 133. In some embodiments, the grind relief region 134 can be positioned adjacent to or next to the guide region 133, but it will be appreciated that the grind relief region 134 can be spaced away from the guide region 133. Referring to FIG. 1A, the guide region 133 in some embodiments may be generally positioned relatively close to the second end 130b in the illustrated embodiment. The grind relief region 134 has a diameter D5 that is smaller than the diameter D4 of the guide region 133 and the diameter D2 of the rotor bore 122. The grind relief region 134 can help receive debris that may be formed during the press and/or transition fitting of the shaft 130 and the rotor bore 122. The grind relief region 134 can also help removal of the rotor 120 from the shaft 130. The grind relief region 134 can be generally positioned adjacent to any region that can have a tendency to produce debris during an assembly or removal process. In some embodiments, the grind relief region 134 may not need to be grounded to a close tolerance, which can help reduce the manufacturing cost and time.

When the rotor bore 122 is initially mounted onto the shaft 130, the second end 130b generally has a clearance fit between the shaft 130 and the rotor 120. The second end 130b of the shaft 130 can include a counter-bore 135 that can be expanded radially relative to the centerline C by a plug 150 and a connecting device 152, such as for example a screw, so that the counter-bore 135 can eliminate the clearance between the shaft 130 and the rotor 120 and form a press fit with the rotor bore 122.

Figure 2A:
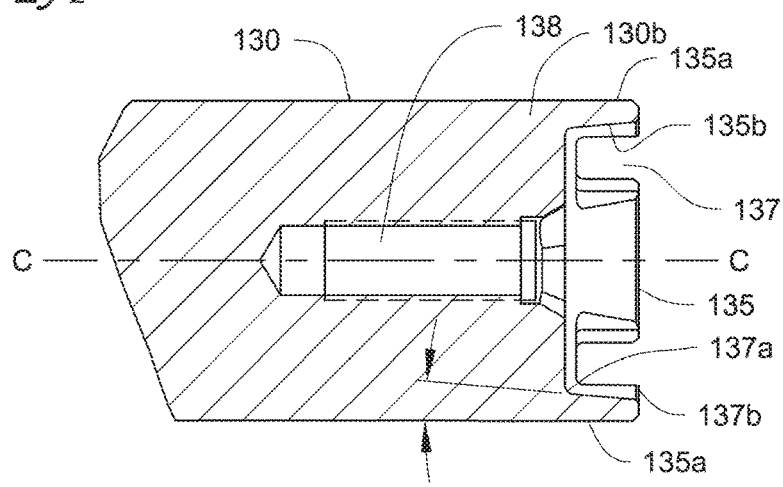
FIGS. 2A and 2B illustrate a cross-section view of a second portion of the shaft and an end view of the shaft/rotor assembly with the shaft installed inside a rotor bore of a rotor.
Figure 2B:
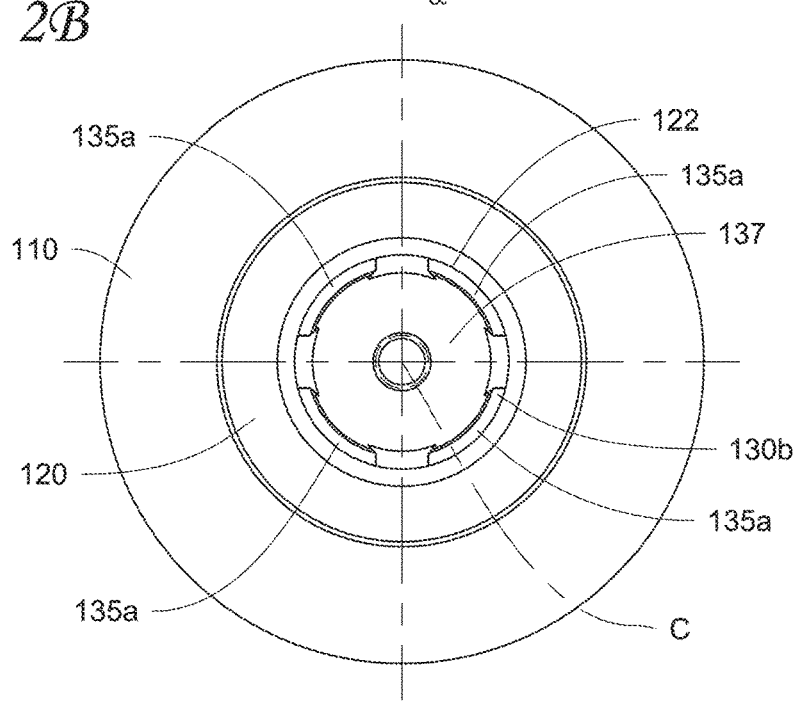

FIGS. 2A and 2B illustrate more details of the second end 130b of the shaft 130 including the counter-bore 135. FIG. 2A illustrates a section of the shaft 130 that is close to the second end 130b. FIG. 2B illustrates an end view from the second end 130b of the shaft 130 as illustrated in FIG. 1A with the plug 150 and the connecting device 152 removed.

As illustrated in FIG. 2A, the second end 130b includes the counter-bore 135. Referring to FIG. 2B, the counter-bore 135 of the second end 130b can include an expandable structure that can be expanded outwardly relative to the centerline C along the circumference of the second end 130b of the shaft 130. In some embodiments, the second end 130b of the counter-bore 135 may include the expandable structure, as for example a plurality of crenulations 135a, along a circumference of the second end 130b of the shaft 130. The counter-bore 135 generally defines a pocket 137 that is recessed into the second end 130b.

In some embodiments, an inner surface 135b of the crenulations 135a can be tapered. In a direction from an inner side 137a of the pocket 137 to an outer side 137b of the pocket 137, the tapered inner surface 135b is configured to lean radially outward relative to the centerline C. In some embodiments, relative to the longitudinal direction that is defined by the centerline C, the tapered inner surface 135b forms an angle α that is at or about 5 degrees, with the appreciation that a can be other angles (e.g. at or about 2 to at or about 20 degrees).

The pocket 137 opens into a cavity 138 that extends into the second end 130b of the shaft 130 along the centerline C. The cavity 138 can be generally configured to capture the connecting device 152 when the connecting device 152 is fed into the cavity 138 (see for example FIG. 3). In some embodiments, the cavity 138 can be threaded.

Referring to the end view as illustrated in FIG. 2B, the second end 130b can form a clearance fit with the rotor bore 122 of the rotor 120. When the plurality of crenulations 135a of the counter-bore 135 expand radially relative to the centerline C, the crenulations 135a can eliminate the clearance between the rotor bore 122 and the shaft 130 and can form a press fit with the rotor bore 122, which can help transmit a torque from the rotor 120 to the shaft 130.

Figure 5:
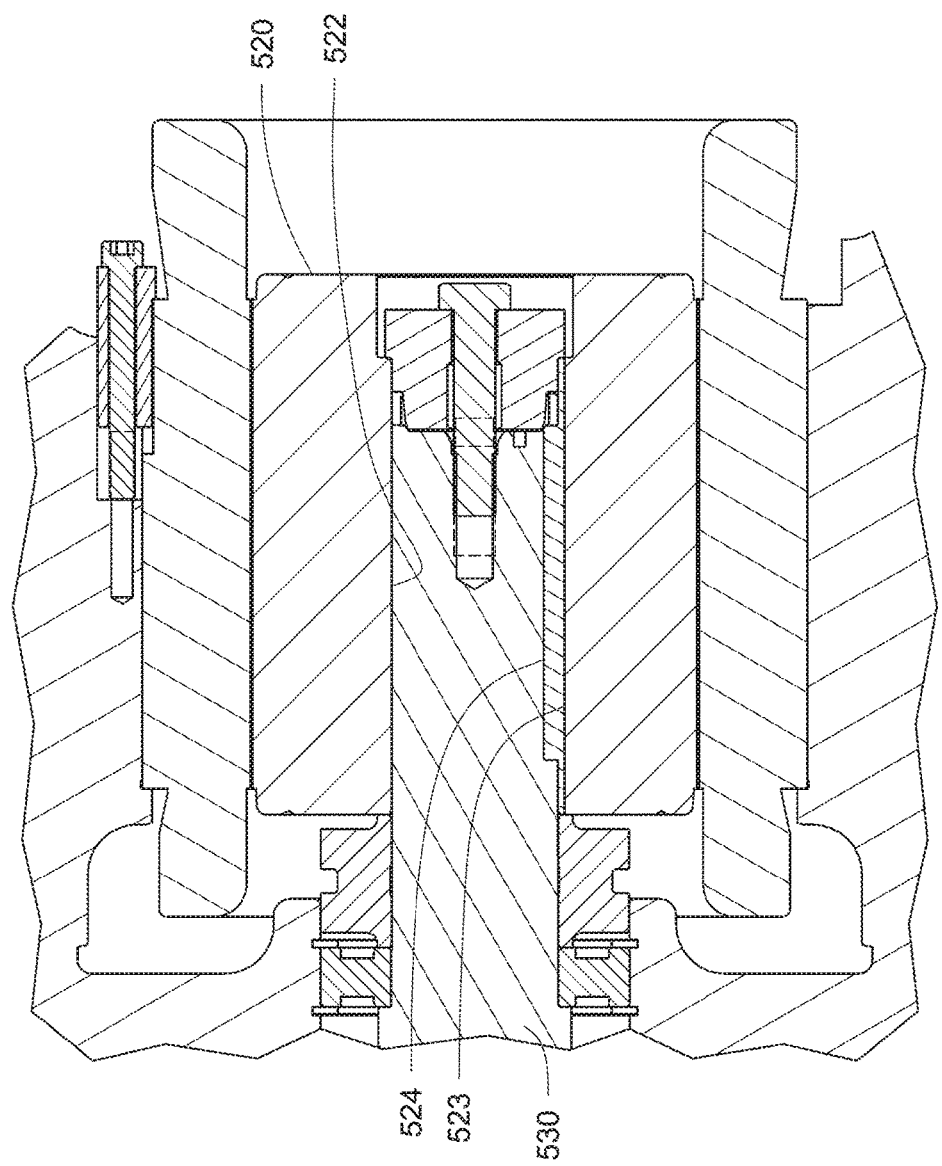
FIG. 5 illustrates a cross-section view of a motor and a shaft, according to another embodiment.

In some embodiments, the rotor bore 122 and the shaft 130 can also include other feature(s) to help transmit the torque from the rotor 120 to the shaft 130, such as a key structure (e.g. a key and a matching key slot). For example, as shown in FIG. 5, in some embodiments, a rotor bore 522 of a rotor 520 can include a key slot 523 that is configured to receive a key 524 on a shaft 530. The key 524 and the matching key slot 523 can help transmit the torque between the rotor 520 and the shaft 530.

Figure 3:
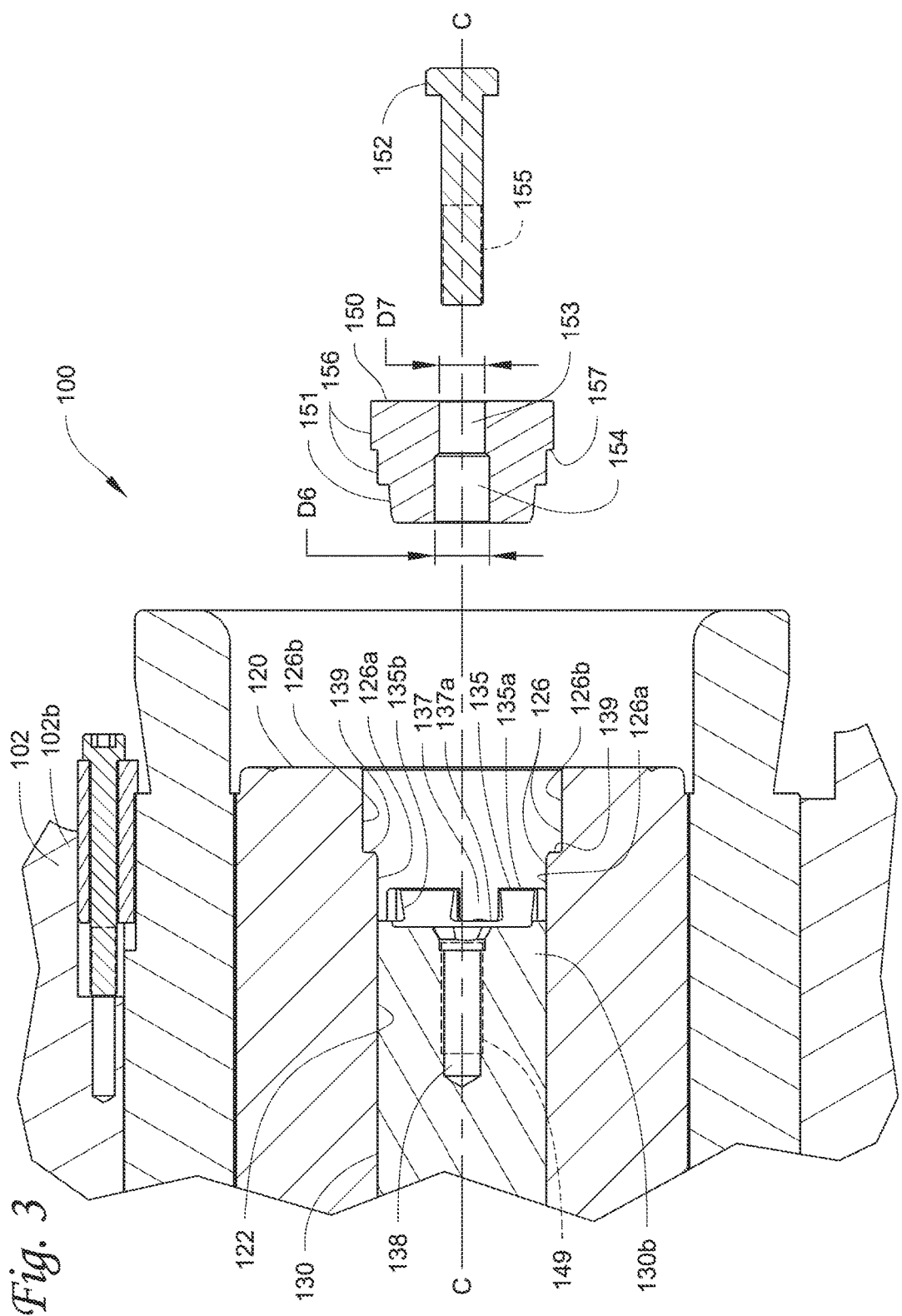
FIG. 3 is an exploded view of a portion of the motor of FIG. 1A.

In the illustrated embodiment of FIGS. 1 to 3, there are four crenulations 135a evenly distributed along the circumference of the second end 1301), with the appreciation that the number of crenulations 135a is merely exemplary.

Referring to FIG. 3, an exploded view of the motor 100 including the second end 130b of the shaft 130 is shown. The plug 150 is configured to have a connecting portion 151 that is configured to engage the crenulations 135a of the counter-bore 135, and a guiding portion 156 that is configured to engage the rotor bore 122 and help center the plug 150 relative to the centerline C. The plug 150 is also configured to have a first center hole 154. In some embodiments, the first center hole 154 can be configured to have clearance relative to the connecting device 152. The plug 150 also has a second center hole 153 that is configured to allow the connecting device 152 to pass through. In some embodiments, the second center hole 153 can be configured to be threaded to receive a larger diameter push-off device (e.g. a push-off screw, not shown) for disassembly.

During mounting, the plug 150 can be installed from the second end 102b of the housing 102. The connecting portion 151 of the plug 150 is received by the pocket 137 and engages the tapered inner surface 135b of the crenulations 135a. As the plug 150 advances into the pocket 137, the connecting portion 151 can push the crenulations 135a outwardly in a radial direction relative to the centerline C, so that the crenulations 135a can form a press fit with the rotor bore 122.

As illustrated in FIG. 3, the rotor bore 122 can be configured to have guiding surfaces 126 that can engage the guiding portion 156 of the plug 150 so as to help center the plug 150 relative to the centerline C. In some embodiments, for example, the guiding surfaces 126 can be configured to form a clearance fit with at least a portion of the guiding portion 156 so that the plug 150 can be positioned relatively centered with respect to the centerline C. The term "clearance fit" generally refers to a clearance fit with a diametral clearance of, for example, at or about 0.0005 inch to at or about 0.012 inch.

The connecting device 152 is generally configured to help advance the plug 150 into the pocket 137. The connecting device 152 can be a screw and configured to have a thread 155 and the cavity 138 of the shaft 130 can be configured to have a matching thread 149. The connecting device 152 can be positioned through the second center hole 153 of the plug 150, and the thread 155 can engage the matching thread in the cavity 138. As the connecting device 152 advances into the cavity 138, the connecting device 152 can push the plug 150 into the pocket 137. The connecting portion 151 can push the crenulations 135a outwardly relative to the centerline C to eliminate the clearance between the shaft 130 and the rotor bore 122 so as to form a press fit with the rotor bore 122.

Figure 4A:
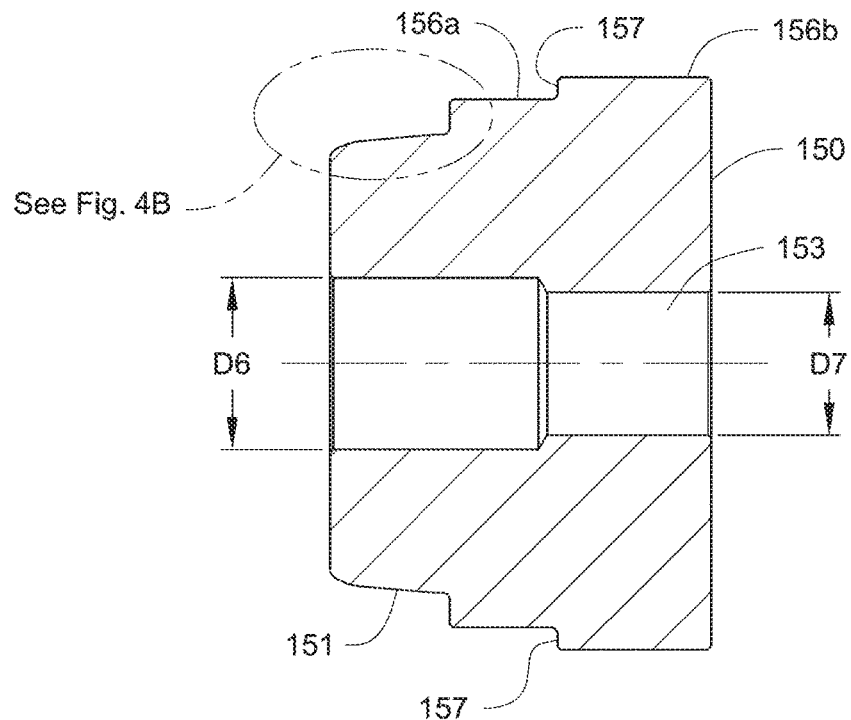
FIGS. 4A and 4B illustrate a plug according to one embodiment.
Figure 4B:
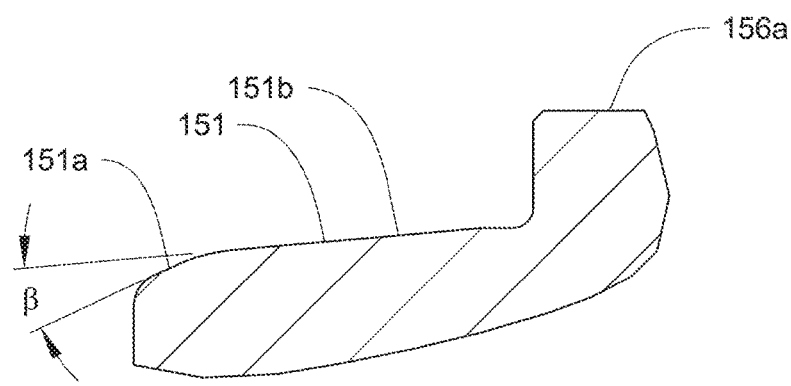

Referring to FIGS. 4A and 4B, details of the plug 150 are further illustrated. FIG. 4A is a cross section of the plug 150, and FIG. 4B is a close-up of a portion of FIG. 4A. As illustrated in FIG. 4A, the guiding portion 156 can be configured to include a first guiding portion 156a and a second guiding portion 156b. A diameter of the second guiding portion 156b can be larger than the first guiding portion 156a. The first guiding portion 156a and the second guiding portion 156b form a first shoulder 157.

Referring back to FIG. 3, the rotor 120 may also be configured to include a second shoulder 139 that is formed at the guiding surfaces 126 of the rotor 120. The guiding surfaces 126 generally include a first portion 126a that has a diameter that is about the same as the diameter D2 of the rotor bore 122 (See FIG. 1A), and a second portion 126b that has a diameter that is larger than the diameter D2. The second shoulder 139 is formed between the first portion 126a and the second portion 126b.

When the rotor 120 is mounted to the shaft 130, the first guiding portion 156a is generally received by the first portion 126a of the rotor bore 122 and the second guiding portion 156b is generally received by the second portion 126b of the rotor 120. The first shoulder 157 formed between the first guiding portion 156a and the second guiding portion 156b can be positioned relatively close to the second shoulder 139 formed between the first portion 126a and the second portion 126b of the rotor bore 122. In some embodiments, the clearance between the first shoulder 157 and the second shoulder 139 may be at or about 0.005 inch to at or about 0.035 inch when the rotor 120 is mounted on the shaft 130. The first shoulder 157 can work as an additional stop if the rotor 120 and the shaft 130 would have a relative movement in the longitudinal direction defined by the centerline C.

Referring to FIG. 4B, a portion of the connecting portion 151 is illustrated. The connecting portion 151 can be configured to include a front portion 151a and an engaging portion 151b. The engaging portion 151b is generally configured to have a tapered shape that generally matches that of the inner surface 135b of the counter-bore 135. When assembled, the tapered engaging portion 151b generally engages the inner surface 135b of the counter-bore 135 so as to push the crenulations 135a of the counter-bore 135 outwardly in the radial direction relative to the centerline C.

The front portion 151a is generally configured to have a tapered shape that is steeper than the engaging portion 151b. In some embodiments, an angle β formed between an extension of the engaging portion 151b and the front portion 151a can be at or about 10 to at or about 30 degrees. Referring to FIGS. 3 and 4B, the front portion 151a can help guide the plug 150 into the pocket 137.

Referring to FIGS. 3 and 4A, to dissemble the shaft 130 from the rotor 120, the second center hole 153 of the plug 150 can be threaded so that a diameter D7 of the second center hole 153 can be a clearance to the connection device 152. A diameter D6 of the first center hole 154 can be slightly larger than the threaded second center hole 153. A push-off device (not shown) can then be threaded into the second center hole 153 of the plug 150 to push the plug 150 away from a pocket floor 137a and the plurality of crenulations 135a. The disengagement of the plug 150 from the plurality of crenulations 135a allows the plurality of crenulations 135a to retract inwardly in the radial direction relative to the centerline C, which in turn releases the press fit between the plurality of crenulations 135a and the rotor bore 122. The shaft 130 and the rotor 120 can then be dismounted relatively easily.

The embodiments as disclosed herein generally allow the rotor 120 to slide onto the shaft 130 relatively easily. After fitting the rib 132 of the shaft 130 into the rotor bore 122 of the rotor 120, the plug 150 and the connecting device 152 can then be used to expand the crenulations 136b to eliminate the clearance between the shaft 130 and the rotor bore 122 to form a press fit between the shaft 130 and the rotor bore 122. The embodiments disclosed herein can generally allow the rotor 120 to be mounted on the shaft 130 relatively easily. The embodiments as disclosed herein may be suitable for mounting a shaft to a rotor of a motor with permanent magnets, because the embodiments as disclosed herein can reduce/eliminate the need for heating the rotor 120 for mounting the rotor 120 and the shaft 130. The press/transition fit between the rib 132 and the rotor 120 and the press fit between the second portion 136b of the shaft 130 and the rotor 120 can also help transmit a torque from the rotor 120 to the shaft 130, eliminating the need for other mounting techniques such as axially clamping The embodiments as disclosed herein can help ensure that the rotor 120 and the shaft 130 are concentric, which may help balance the rotor/shaft assembly.

Figure 6:
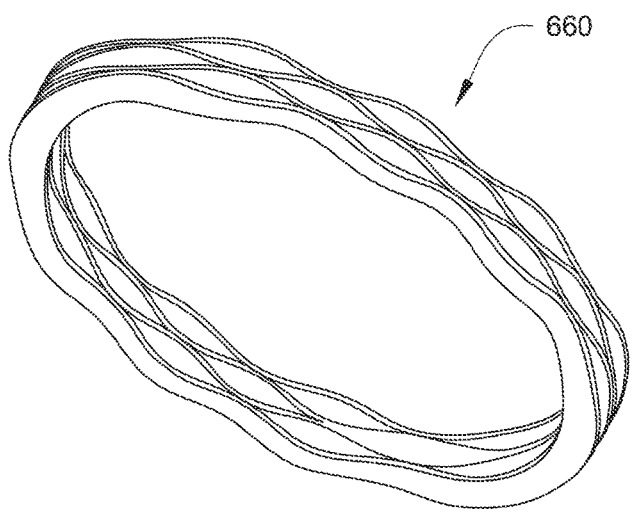
FIG. 6 shows a perspective view of one embodiment of an axial biasing member, which may be used with the plug and rotor.
Figure 7:
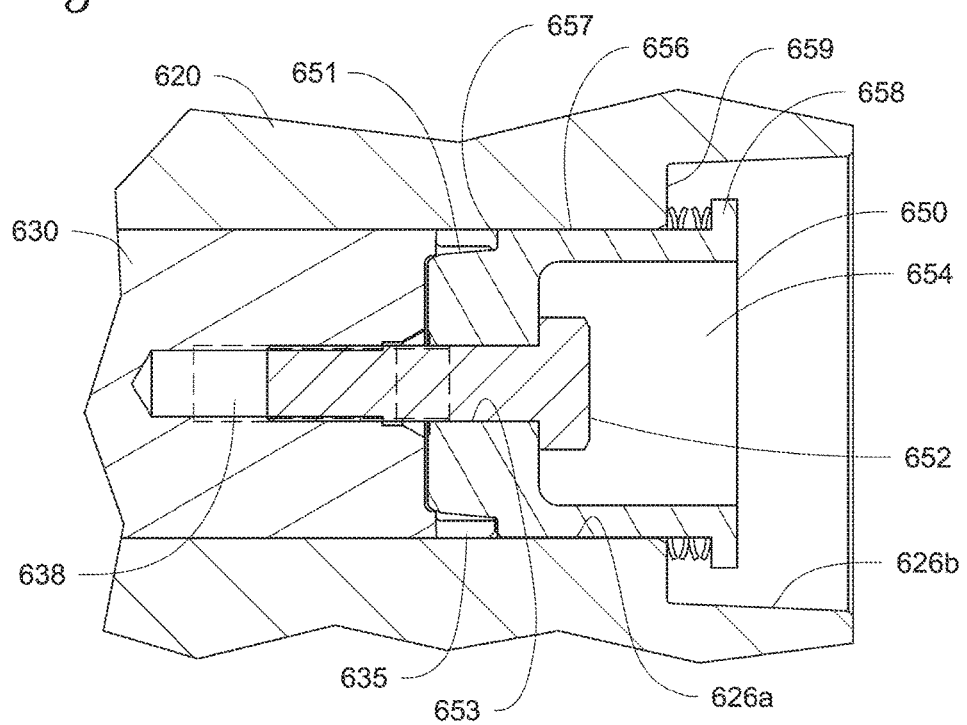
FIG. 7 shows a partial side sectional view of one embodiment of an implementation of an axial biasing member assembled with one embodiment of a plug.
Figure 8:
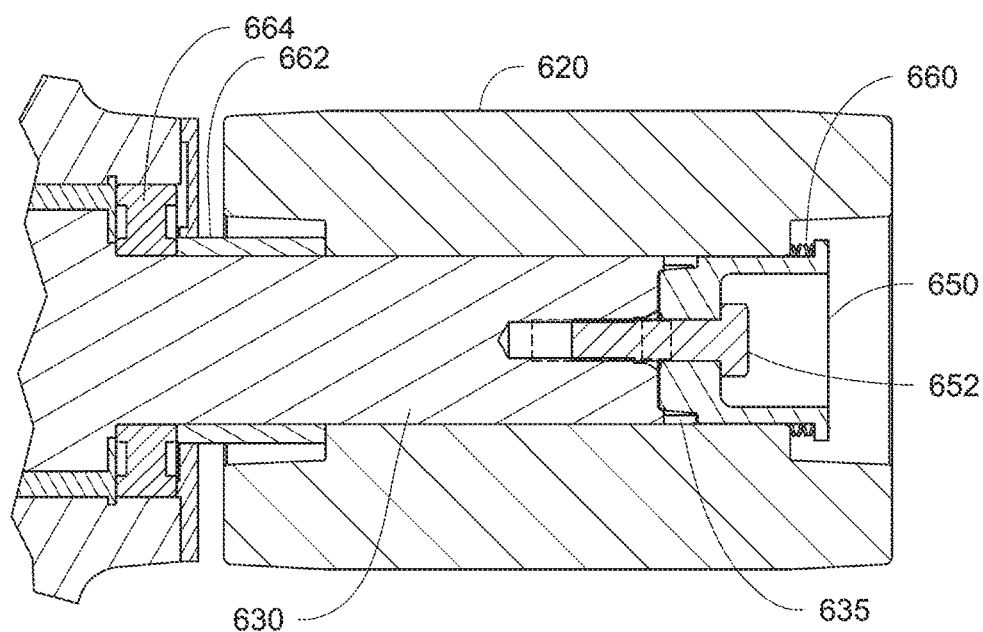
FIG. 8 shows another partial side section view of the implementation shown in FIG. 7.

In some embodiments, a pre-loading axial force can be applied to the motor rotor so as to run through the rotor and clamp other portions of the compressor, such as for example but not limited to a sleeve and/or portions of a bearing. FIGS. 6 to 8 show an exemplary embodiment of an implementation using a pre-loading axial force, such as before completing assembly of the plug to the shaft.

Figure 9:
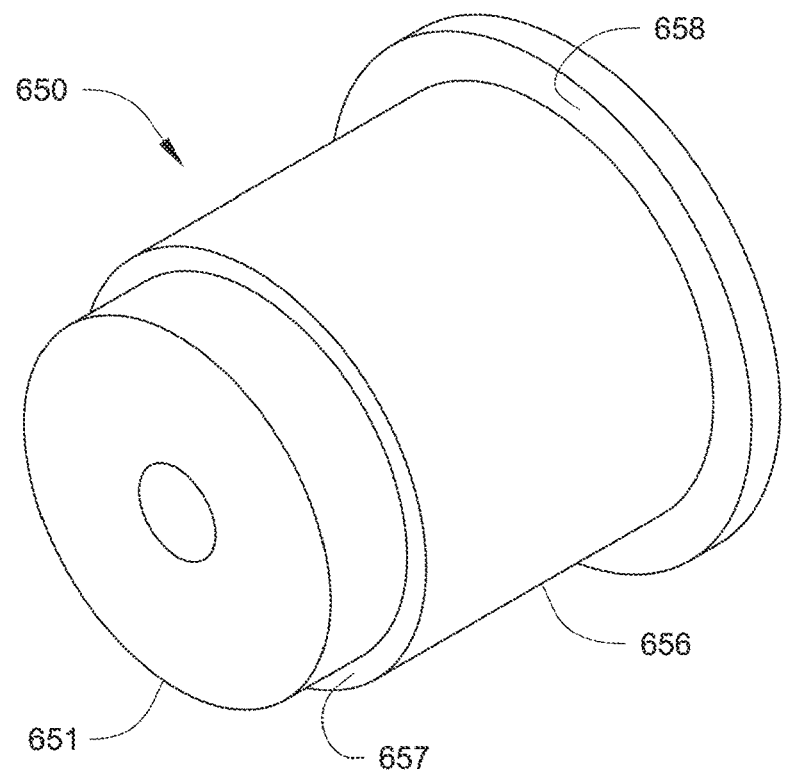
FIG. 9 shows one embodiment of a plug alone, which is also shown in FIGS. 7 and 8.

FIG. 6 shows a perspective view of one embodiment of an axial biasing member 660, which may be used with the plug and rotor. FIG. 7 shows a partial side sectional view of one embodiment of an implementation of an axial biasing member 660 assembled with one embodiment of a plug 650. FIG. 8 shows another partial side section view of the implementation shown in FIG. 7. FIG. 9 shows the plug 650 alone, which is shown in FIGS. 7 and 8.

Referring to FIG. 6, the axial biasing member 660 in some embodiments is a spring. In some embodiments, the spring can be a wave-like spring, which may be constructed as a wire type compression spring. It will be appreciated that the specific construction of the axial biasing member is not meant to be limiting, and can be suitably constructed and configured to provide a desired, suitable, and/or needed amount of axial force. It will also be appreciated that instead of the axial biasing member 660, a pre-set loading mechanism may be employed, for example once the plug is installed in a loose type fit, a mechanism would apply an axial load to the motor rotor. Once the pre-load with this mechanism is applied, the retainer could then be tightened down to create the radial expansion of the expandable structure. Such a mechanism would have a suitable, desired, and/or needed amount of adjustment to make up for the axial tolerance that the axial biasing member would have applied. The axial force can allow for axial movement which may be useful in occurrences of tolerance stack up, and also can provide a relatively constant axial force as the plug is tightened down, which provides a more controlled applied force.

Referring to FIGS. 7 and 8, the axial biasing member 660 can be loaded between a flange 658 of a plug 650 and a surface or shoulder 659 of the rotor. FIGS. 7 and 8 show a partial side view of the assembly of the rotor 620, shaft 630, counter-bore with expandable structure 635, plug 650, connecting device 652, and axial biasing member 660. During assembly, the rotor 620 can be mounted on the shaft 630, the plug 650 inserted into the rotor bore and counter-bore of the shaft. During insertion of the plug 650, the axial biasing member 660 imparts an axial force on the rotor and through the rotor to other parts of the compressor. In some embodiments, the axial force can act to clamp parts together, such as the rotor 620, a sleeve 662 and/or part of a bearing 664. See FIG. 8.

With reference to FIG. 7, further details of the assembly of the plug 650, axial biasing member 660, rotor 620, and shaft 630 are shown. The axial biasing member 660 can be disposed between a flange 658 of the plug 650 and a shoulder or surface 659 of the rotor. The plug 650 is similar in function to the plug 150, but with some differences in its structure. See also FIG. 9.

The plug 650 has first opening 653 through which the connecting device 652 can be inserted to access the opening 638 of the shaft 630, such as for example in a threaded engagement. The first opening 653 may also be configured to support a push-off device threaded into the first opening 653. The plug 650 includes a second opening 654 through which the connecting device can be inserted, and which includes a surface or shoulder on which a portion of the connecting device 152 can abut. The plug 650 includes outer surfaces 651 and 656, with a shoulder therebetween. The surface 651 in some embodiments is a connecting portion which engages the expandable structure 635 of the shaft 630, and can push or expand the expandable structure radially outward to fit with the rotor 620. The outer surface 651 can create a mating portion at the end of the plug that fits inside and when inserted, expands the area within the expandable structure 635. The shoulder 657 may engage or abut against the end of the expandable structure 635 and act as a stop for insertion of the plug 650. The surface 656 can engage with the inner surface 626a of the rotor 620, while the inner surface 626b may act as a cavity or pocket into which the plug 650 may be inserted, and in some cases such as shown recessed into the pocket created by the inner surface 626. It will be appreciated that the plug 650 and its structure can afford similar function, e.g. desired fittings, relative to the shaft and rotor, as with the plug 150 described above.

The construction of using axial pre loading or clamping (e.g. by the axial biasing member) and the radial expansion of the expandable structure can be useful in many applications, such as for example in a screw compressor using an induction motor rotor, which has stacked metal laminations cast together for example with aluminum. Deformation of the motor rotor can be avoided, which in turn avoids undesired and/or unacceptable motor rotor run out which may otherwise be caused by the deformation. For example, the sleeve (e.g. 662) is installed first, such as on the male compression rotor, and then slides up against the male suction bearing inner race (e.g. 664). The motor rotor (e.g. 620) is then installed next on the male compressor rotor. The plug or retainer (e.g. 650) rests against the motor rotor and is installed last with a bolt (e.g. connecting device) that runs through it and threads into the end of the shaft (e.g. 620). The motor rotor, plug, and sleeve assembly is then tightened down up against the male suction bearing inner race by the bolt threaded into the end of the rotor, and then the expandable structure expands radially to fit the shaft to the rotor.

ASPECTS

Any of aspects 1-9 can be combined with any of aspects 10-11.

Aspect 1. A shaft of a compressor, comprising:
a rib along a circumference of the shaft;
an end of the shaft including an expandable structure, wherein the expandable structure includes a pocket that is configured to receive a plug;
a cavity extending into the end of the shaft, the cavity configured to engage a connecting device;
wherein when the pocket receives the plug, the expandable structure is configured to be expandable by the plug in a radial direction relative to a centerline of the shaft.

Aspect 2. The shaft of aspect 1, wherein a diameter of the rib is configured to form a press fit with a rotor bore of a rotor.

Aspect 3. The shaft of any of aspects 1-2, wherein a diameter of the rib is configured to form a transition fit with a rotor bore of a rotor.

Aspect 4. The shaft of any of aspects 1-3, further comprising:
a guiding portion close to the rib, wherein the guiding portion is configured to form a clearance fit with a rotor bore of a rotor.

Aspect 5. The shaft of aspect 4, further comprising:
a grind relief region, wherein the grind relief region is configured to form a clearance fit with the rotor bore of the rotor, a diameter of the grind relief region is smaller than a diameter of the guiding portion.

Aspect 6. The shaft of any of aspects 1-5, wherein when the expandable structure is expanded by the plug in the radial direction relative to the centerline of the shaft, the plurality of crenulations is configured to form a press fit with a rotor bore of a rotor.

Aspect 7. The shaft of any of aspects 1-6, wherein the expandable structure includes a tapered inner surface that is configured to engage the plug.

Aspect 8. The shaft of any of aspects 1-7, wherein the expandable structure includes a plurality of crenulations.

Aspect 9. The shaft of any of aspects 1-8, wherein the plug includes a guiding portion that is configured to form a clearance fit with a portion of the rotor bore when a connecting portion of the plug engages the expandable structure.

Aspect 10. A rotor and shaft assembly, comprising:
a rotor, the rotor including a center rotor bore;
a shaft, the shaft received by the rotor bore; and
a plug and a connecting device;
wherein a portion of the shaft including a rib along a circumference of the shaft, the rib is configured to form a press fit or a transition fit with the rotor bore;
an end of the shaft including an expandable structure, wherein the expandable structure includes a pocket that is configured to receive the plug;
an opening extending into the end of the shaft, the hole configured to engage the connecting device;
and the connecting device is configured to push the plug into the pocket which results expansion of the expandable structure in a radial direction relative to a centerline of the shaft, as the connecting device is tightened into the hole.

Aspect 11. The rotor and shaft assembly of aspect 10, wherein the expandable structure includes a plurality of crenulations.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

What is claimed is:

1. A rotor and shaft assembly, comprising:
    a rotor, the rotor including a rotor bore;
    a shaft, the shaft received by the rotor bore, the shaft includes an elongated body having a first end and a second end, wherein the first end defines a mounted end and the second end defines a loading end;
    a plug, an axial biasing member, and a connecting device;
    the second end of the elongated body includes an expandable structure, wherein the expandable structure defines a pocket that is configured to receive the plug; and
    the axial biasing member is disposed completely between the expandable structure and the plug;
    the connecting device is configured to push the plug into the pocket which results in expansion of the expandable structure.

2. The rotor and shaft assembly of claim 1, wherein the axial biasing member is compressible by the plug.

3. The rotor and shaft assembly of claim 1, wherein the rotor includes a shoulder, the plug includes a flange, and the axial biasing member is disposed between the shoulder and the flange.

4. The rotor and shaft assembly of claim 3, wherein the axial biasing member separates the shoulder and the flange while dispersing an axial force.

5. The rotor and shaft assembly of claim 3, wherein the axial biasing member is compressible between the shoulder and the flange.

6. The rotor and shaft assembly of claim 1, wherein the axial biasing member is a spring.

7. The rotor and shaft assembly of claim 6, wherein the spring is a wave-like spring or a wire type compression spring.

8. The rotor and shaft assembly of claim 1, wherein the axial biasing member is configured to provide a controlled applied force when the connecting device is tightened into the plug.

9. The rotor and shaft assembly of claim 1, wherein the expansion of the expandable structure is configured to be in a direction that is different from a direction of compression of the axial biasing member.

10. The rotor and shaft assembly of claim 1, wherein the expandable structure is configured to be expandable by the plug in a radial direction relative to a centerline of the elongated body, and the axial biasing member is compressible in an axial direction relative to the centerline of the elongated body.

11. The rotor and shaft assembly of claim 1, wherein the axial biasing member is configured to impart an axial force through the rotor when compressed, the axial force clamps the rotor to a sleeve and a portion of a bearing in a compressor.

12. The rotor and shaft assembly of claim 1, wherein the axial biasing member surrounds a guiding portion of the plug positioned outside of the pocket.

13. A rotor and shaft assembly, comprising:
    a rotor, the rotor including a rotor bore;
    a shaft, the shaft received by the rotor bore, the shaft includes an elongated body having a first end and a second end, wherein the first end defines a mounted end and the second end defines a loading end;
    a plug, an axial biasing member, and a connecting device;
    wherein the shaft includes a rib configured to form a press fit or a transition fit with the rotor bore, and the rib is disposed closer to the first end of the elongated body than the second end of the elongated body;
    the second end of the elongated body includes an expandable structure, wherein the expandable structure defines a pocket that is configured to receive the plug;
    the axial biasing member is disposed completely between the expandable structure and the plug; and
    the connecting device is configured to push the plug into the pocket which results in expansion of the expandable structure.

14. The rotor and shaft assembly of claim 13, wherein the axial biasing member is compressible by the plug.

15. The rotor and shaft assembly of claim 13, wherein the rib is a smooth protruded region.

16. A compressor in a heating, ventilation, and air conditioning (HVAC) system, the compressor connected to a motor, the motor comprising:
    a rotor, the rotor including a rotor bore;
    a shaft, the shaft received by the rotor bore, the shaft includes an elongated body having a first end and a second end;
    a plug, an axial biasing member, and a connecting device;
    the second end of the elongated body includes an expandable structure, wherein the expandable structure defines a pocket that is configured to receive the plug;
    the axial biasing member is disposed between a shoulder of the rotor and a flange of the plug; and
    the connecting device is configured to push the plug into the pocket which results in expansion of the expandable structure and compression of the axial biasing member.

* * * * *